United States Patent [19]

Gerst et al.

[11] 3,781,716

[45] Dec. 25, 1973

[54] BIPHASE RADIO-FREQUENCY MODULATOR

[75] Inventors: Thomas E. Gerst, Albuquerque; John G. Webb, Jr., Sandia Park, both of N. Mex.

[73] Assignee: The United States of America as represented by the United States Atomic Energy Commission, Washington, D.C.

[22] Filed: Oct. 27, 1972

[21] Appl. No.: 301,410

[52] U.S. Cl. .................... 332/9 R, 332/12, 332/24, 333/20

[51] Int. Cl. .................... H03k 7/00

[58] Field of Search .................... 332/23 R, 24, 9 R, 332/12; 333/20, 7 D, 29; 325/163

[56] References Cited

UNITED STATES PATENTS

| | | | |
|---|---|---|---|
| 2,875,412 | 2/1959 | Kaplan | 332/12 |
| 3,346,822 | 10/1967 | Levy et al. | 333/7 D |

*Primary Examiner*—Paul L. Gensler
*Attorney*—John A. Horan

[57] ABSTRACT

A biphase radio-frequency modulator which includes a pair of electrically balanced circuit branches, one branch having a phase inverting transmission line transformer with the other branch having a noninverting transmission line transformer connected therein, together with means for selectively directing radio-frequency signals in one or the other of the branches and means for coupling the inverted or noninverted signals from the branches to an output terminal.

6 Claims, 4 Drawing Figures

BIPHASE RADIO-FREQUENCY MODULATOR

BACKGROUND OF INVENTION

Biphase or digital-type phase modulators may be used in such applications as communications, telemetry, radar and the like where information may be conveyed and used with a radio-frequency signal having alternating portions with different phase relationships. The different phase relationships may be produced so as to have regular and equal width or random width states or patterns of phase change of the radio-frequency signal. Many of these applications require that the biphase modulation be achieved in very short time periods compared to the time duration of each phase state and that there be low power losses, low voltage standing wave ratios (VSWR) and inherently broad bandwidth capabilities.

Many prior phase modulators have required relatively large circuit elements to provide phase modulation at frequencies in the low end of the radio-frequency spectrum which either limited the modulator circuit elements to narrow band-type devices or required inordinately large circuit sizes to achieve the modulation.

In this invention, the reference to radio-frequency signals refer to those frequencies in the ranges of generally around 30 to 300 megaHertz (VHF), 300 to 1000 megaHertz (UHF) and above 1000 megaHertz (microwave) frequencies. It would be desirable for such a biphase modulator to be capable of operating throughout these frequencies, particularly the VHF and UHF frequencies, using only lumped constant elements which need only be selected to operate at desired frequency levels.

SUMMARY OF INVENTION

In view of the above, it is an object of this invention to provide a radio-frequency signal biphase modulator which is useable at frequencies from VHF into the microwaves.

It is a further object of this invention to provide such a modulator which has relatively small size at all these frequencies.

It is a still further object of this invention to provide a radio-frequency signal biphase modulator which exhibits low losses and low VSWR with rapid switching times.

Various other objects and advantages will appear from the following description of the invention, and the most novel features will be particularly pointed out hereinafter in connection with the appended claims. It will be understood that various changes in the details, materials, and arrangements of the parts, which are herein described and illustrated in order to explain the nature of the invention, may be made by those skilled in the art.

This invention relates to a radio-frequency biphase modulator which utilizes a phase inverting transmission line transformer with means for switching a radio-frequency signal to the transformer and other means for conveying the inverted radio-frequency signal from the transformer to an output terminal together with a circuit branch balanced electrically with these means and the transmission line transformer for conveying the radio-frequency signal to the output terminal when the signal is not being inverted by the transformer.

DESCRIPTION OF DRAWING

The present invention is illustrated in the accompanying drawing wherein.

DETAILED DESCRIPTION

Figures 1, 2, 3, 4:
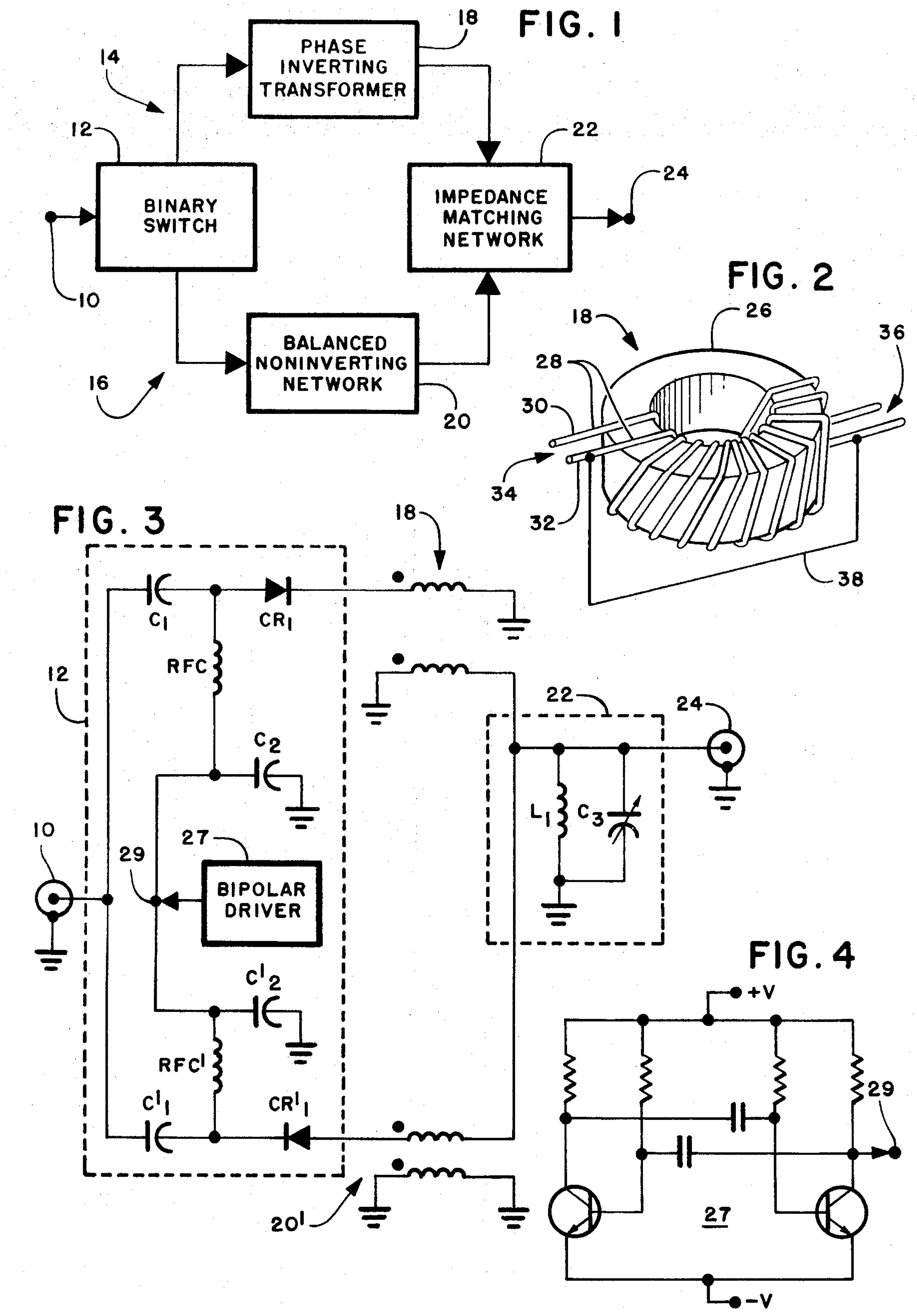
FIG. 1 is a simplified block diagram of a biphase modulator circuit incorporating the features of this invention.
FIG. 2 is a perspective view of a transmission line transformer which may be utilized in the circuit of FIG. 1.
FIG. 3 is a schematic diagram of a biphase modulator circuit showing an arrangement of typical circuit elements.
FIG. 4 is a schematic diagram of a circuit which may be used to control the modulator shown in FIG. 3.

A typical biphase modulator circuit arrangement utilized by this invention is shown in FIG. 1 which will convert a single phase radio-frequency signal into an output signal having periodic or randomly distributed periods of the same phase and the opposite phase. An appropriate radio-frequency signal of some desired frequency may be coupled through an input terminal 10 through a binary switch 12 to one or the other of the circuit branches 14 and 16. Branch 14 includes a phase inverting transformer 18 which is capable of converting the radio-frequency signal at input terminal 10 to a radio-frequency signal having the opposite phase with respect to the initial signal. Branch 16 includes a noninverting network or apparatus 20 which is electrically balanced with transformer 18 so as to transmit the initial radio-frequency signal from input terminal 10 without change or with little change of phase and with the same impedance and loss effects as transformer 18. The outputs of transformer 18 and balance network 20 may then be coupled through an impedance matching network 22 to an appropriate output terminal or transmission line 24 and thence to a suitable utilization device or system. The radio-frequency signal at terminal 24 will include portions at the same or similar phase as the initial radio-frequency signal with alternating portions of the opposite phase signal, the period at each signal state being determined by the circuit path or branch selection provided by binary switch 12.

The inverting transformer 18 may take the form of and be constructed as shown generally in FIG. 2. Phase inverting transformer 18 may include an appropriate magnetic core 26 on which is wound a bifilar transmission line 28 with some preselected number of turns depending upon the frequency of the radio-frequency signal (generally from about 1 to 20 turns in the frequency range described above) and the permeability of core 26. The transmission line 28 may be in the form shown consisting of a pair of appropriately insulated, generally parallel conductors or wires 30 and 32 wound in side by side fashion about core 26 or it may be in the form of an insulated, twisted pair of wires or any other convenient configuration having a suitable impedance to match the other characteristic impedances of the modulator arrangement. The winding formed by wire 30 may be considered as a "primary" winding with the wound wire 32 a "secondary" winding of the transformer. Because of the symmetrical nature of the winding shown, either end of the transmission line 28 may be considered as the input end, generally noted for purpose of illustration and description as end 34, with the other end 36 being the output end of the transformer. With the windings formed from the transmission line 28 shown, wire 30 is to the left of the drawing at input end 34 and at the right of the drawing at output end 36. The input end of wire 32 and the output end of wire 30 may be electrically connected together, such as shown by conductor 38, or appropriately connected to a common conductor or ground, as desired, to provide the desired phase inverting characteristics. The connection of these transmission line ends provides an effective direct current short circuit through the transformer. Thus, the input end of wire 30 may be connected or coupled to the binary switch 12 with the output end of wire 32 connected through the impedance network 22 to output terminal 24 of the modulator, as shown in FIG. 1.

The noninverting network 20 is preferably designed or selected so as to have the same or similar impedance characteristics as transmission line transformer 18. A particularly convenient and preferred network 20 is a transmission line transformer having the same core, transmission line and number of turns as the inverting transformer 18, but with the input and output end of one of the transmission line wires connected together and the input and output ends of the other wires connected respectively to the binary switch 12 and the impedance matching network 22.

The transformer core 26 may take the form of a toroidal or other generally annular shape, as shown, or it may take the form of a linear core, however, with increased leakage inductance. The core 26 material may be formed from any powdered iron or iron mixture or ferrite material pressed into the desired shape or configuration which has a high permeability and low core losses. Generally, the larger the core permeability, the fewer turns required for a given frequency response and the larger the overall bandwidth of the core. Typical relative permeabilities at the frequencies mentioned may be in excess of 10. The transmission line wound about the transformer core should generally have a characteristic impedance greater than the desired effective impedance of the transformer as the transformer core may tend to lower the transmission line impedance to thus bring the resulting transformer characteristic impedance in line with the impedances of other portions of the modulator and any apparatus associated therewith.

A typical circuit arrangement using phase inverting transmission line transformer 18 and a balanced, noninverting transformer 20', as described above, which may be utilized in the present biphase modulator is shown in FIG. 3. The binary switch 12 portion of the modulator utilizes a bipolar driver 27 connected through terminal 29 to suitable balanced active and inactive circuit elements to alternately direct a radio-frequency signal from input terminal 10 to the respective inverting and noninverting transformers 18 and 20'. The balanced circuit elements utilized may include a radio-frequency choke (RFC and RFC'), direct current isolation and coupling capacitors ($C_1$ and $C'_1$), bypass capacitors ($C_2$ and $C'_2$), and suitable fast acting, switching diodes ($CR_1$ and $CR'_1$). Impedance matching network 22 may include a parallel connected inductor ($L_1$) and variable capacitor ($C_3$) to effectively tune out the reactance of the nonactive transformer, which may otherwise appear as a length of transmission line open-circuited at its far end to output terminal 24. Output signal amplitude balance may thus be maintained between the two legs or branches of the modulator since equal transformer losses are inserted in each branch and phase balance is maintained by the equal path lengths through each branch. Diodes $CR_1$ and $CR'_1$ may preferably be selected to provide a desired switching speed of the modulate signal between the respective output phase states. The bipolar driver may be any appropriate trigger, multivibrator or pulse generating circuit that is capable of providing a switching signal sufficient to hold one diode on and the other off and have the capability to switch between states with the required speed, such as the circuit shown generally in FIG. 4. This circuit may produce a bipolar, generally square wave output to terminal 29 in FIG. 3 which varies from near +V to near −V volts in time periods and switching speeds determined by circuit elements and parameters in a well known manner. A typical switching speed of 5 percent of the shortest duration in each phase state may be utilized in order to minimize dead time in the modulated radio-frequency waveform at output terminal 24.

It is understood that any appropriate source of radio-frequency signals may be used to supply the radio-frequency signal at input terminal 10 and that any desired utilization means, as described generally above, (including radar or communication circuits, or the like) may be coupled to output terminal 24 to utilize the modulated signal.

Typical circuit element values which may be used with a radio-frequency signal having a center frequency of about 360 megaHertz are as follows:

| Element | Circuit Element Value |
|---|---|
| $C_1$ and $C'_1$ | 15 picofarad |
| $C_2$ and $C'_2$ | 20 picofarad |
| $C_3$ | 0.8 to 10 picofarad |
| RFC and RFC' | 0.22 microhenries |
| $L_1$ | 35 nanohenries |

The core may be formed from a ferrite about ⅛ inch in diameter with a low frequency relative permeability of about 25. The transmission line used for the respective transformer windings at this frequency may be number 40 bifilar transformer wire having a characteristic impedance of about 61 ohms, which when wound about the transformer core in six turns using about ½ inch length of wire may result in a transformer characteristic impedance of about 50 ohms. The maximum input and output VSWR for this circuit was 1.2 to 1. The insertion loss of the circuit was about 1.2 dB resulting generally from losses in the switching diodes and transformer and from impedance mismatches. The phase difference between the respective phase states may be within ±5° of 180° using a driver pulse length of about 500 nanosecond duration in each state. A dead time of about 20 nanoseconds may be achieved each time the modulator is switched between states.

What is claimed is:

1. A radio-frequency signal biphase modulator comprising radio-frequency input and output terminals; a transmission line transformer including a bifilar wire wound on a magnetic core forming first and second windings, each winding having juxtaposed turns terminating with adjoining input ends and adjoining output ends; means for connecting the input end of said second winding to the output end of said first winding; a circuit element electrically balanced with said transformer at said signal frequency and including input and output junctions; means for alternately coupling a radio-frequency signal from said input terminal to the input end of said first winding and to the input junction of said circuit element; and means for coupling the output end of the second winding of said first transformer and the output junction of said circuit element to said radio-frequency output terminal.

2. The biphase modulator of claim 1 wherein said coupling means to said radio-frequency output terminal includes means for matching the impedance from said transmission line transformers to said output terminal.

3. The biphase modulator of claim 1 wherein said circuit element includes a second transmission line transformer including a bifilar wire wound on a magnetic core forming first and second windings, each winding having juxtaposed turns terminating with adjoining input ends and adjoining output ends; means for connecting together the input and output ends of the second winding of said second transformer; and means for connecting the input and output ends of the first winding of said second transformer to said input and output junctions respectively.

4. The biphase modulator of claim 3 wherein said magnetic cores are toroids.

5. The biphase modulator of claim 4 wherein the relative permeabilities of said cores are greater than about 10.

6. The biphase modulator of claim 4 wherein said primary and secondary windings include from about 1 to 20 turns of said bifilar wires.

* * * * *